B. W. Putnam,
Flower Pot.
No. 96,144.   Patented Oct. 26, 1869.

Samuel P. Jenks
A. Kingsbury
Witnesses.

Benj. W. Putnam
Inventor.

United States Patent Office.

BENJAMIN W. PUTNAM, OF BOSTON, MASSACHUSETTS.

Letters Patent No. 96,144, dated October 26, 1869.

IMPROVEMENT IN FLOWER-POTS.

The Schedule referred to in these Letters Patent and making part of the same.

*To all whom it may concern:*

Be it known that I, BENJAMIN W. PUTNAM, of the city of Boston, in the county of Suffolk, and State of Massachusetts, have invented a new and improved Flower-Pot; and I do hereby declare that the following is a full, clear, and exact description of the same, reference being had to the accompanying drawings, with letters of reference marked thereon.

The nature of my invention is that of a pot for the growing of flowers and other vegetation, so arranged as that a body of water is presented in close juxtaposition to the body of earth which carries the flowers, with only a porous medium between; and, further, in a peculiar symmetrical arrangement of the earth-bearing vessels.

In the drawings—

Figure 2:
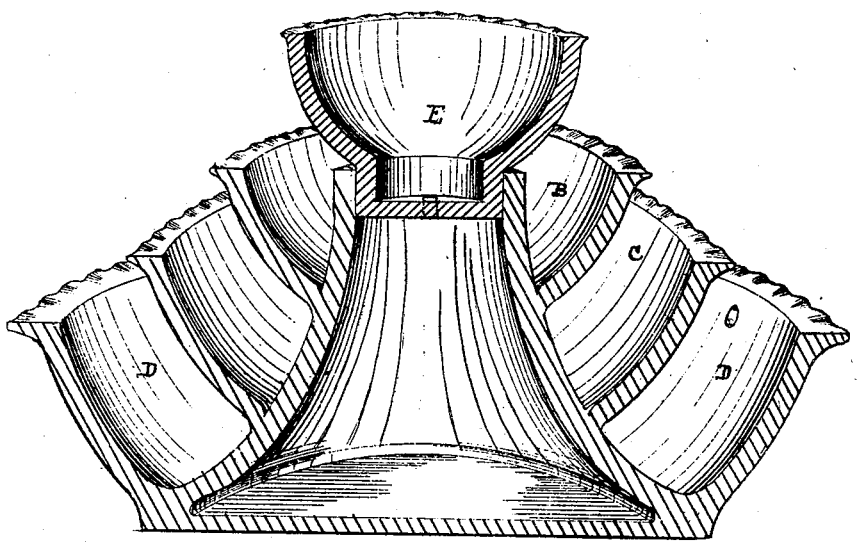
Figure 2 shows a vertical section of the same.

A A, fig. 2, show a hollow vessel, which, in this instance, is nearly in the form of a hollow truncated cone with a bottom to it, and resting on its larger end, and is formed of porous earthenware. This is called the water-vessel.

Figure 1:
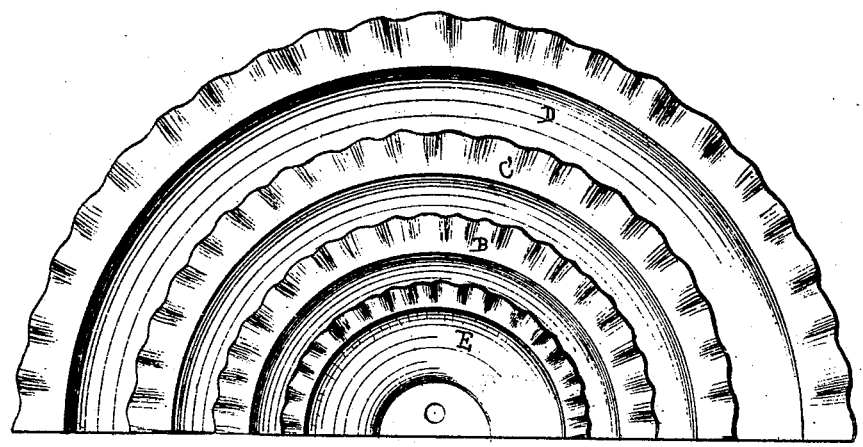
Figure 1 shows a view from the top of my device.

Around this water-vessel are placed, at different elevations, three, more or less, shallow dishes or saucers of earthenware, B B, C C, D D, figs. 1 and 2, which are the earth-vessels.

Through the centre of these passes the water-vessel.

I sometimes make these detachable, and sometimes affix them firmly to the water-vessel.

In practice, in the manufacture of this part of my device, when it is made of earthenware, I at present prefer to mould the water-vessel separately, with solid shelves around it. Then, having moulded the ring-saucers, and partially dried them all, I place the rings on the water-vessel, and luting them on with clay, in the manner known to potters, I bake the whole together.

E, figs. 1 and 2, is a circular pot, of shape in section as shown in fig. 2, which pot is to be filled with earth. It is borne in the aperture of the water-vessel.

I prefer to glaze the bottom of my combined device, and also the outer side of the lower ring-saucer, to prevent the leaking of the water; and I sometimes, instead of porous earthenware, use one or more walls of perforated metal, with a lining between of sand, felt, or other filtrating-medium.

And I do not confine myself to any peculiar shape of my water and earth-vessels. I sometimes cause the point of junction of the rings with the water-vessel to be lower than shown in the drawings, thus securing a large wet surface on the inside.

And the operation of my device is as follows:

The water-vessel is filled with water, and the earth-vessels with earth, when the seeds or plants are placed in the earth, and the water, soaking through the porous wall between the earth and water, keeps the earth moistened, without the necessity of daily care in watering.

I am aware that flower-pots have been constructed with a central earth-vessel, separated from a concentric water-reservoir by a porous wall; but

What I claim, is—

A flower-pot constructed substantially as described, that is to say, with a centrally-arranged water-reservoir, and one or more earth-vessels, situated concentric thereto, the wall intervening between the reservoir and earth-vessel or vessels being of porous material to admit of the percolation of the water through the same, for the purpose specified.

BENJ. W. PUTNAM.

Witnesses:
LEMUEL P. JENKS,
A. KINGSBURY.